United States Patent [19]
Umeda et al.

[11] Patent Number: 5,392,632
[45] Date of Patent: Feb. 28, 1995

[54] SMALL VOLUME PROVER

[75] Inventors: Nobuyoshi Umeda, Tokyo; Toshio Seo, Yokohama; Yuzirou Nagamori, Tokyo; Kenichi Matsuoka, Tokyo; Shingo Gomi, Tokyo, all of Japan

[73] Assignee: Oval Engineering Co.,Ltd., Tokyo, Japan

[21] Appl. No.: 929,658

[22] Filed: Aug. 12, 1992

[30] Foreign Application Priority Data

Oct. 14, 1981 [JP] Japan .................................. 3-295179

[51] Int. Cl.6 ............................................. G01F 25/00
[52] U.S. Cl. ........................................ 73/3; 73/239; 73/252
[58] Field of Search ...................... 73/3, 232, 239, 240, 73/241, 247, 250, 252

[56] References Cited

U.S. PATENT DOCUMENTS

| | | | |
|---|---|---|---|
| 400,401 | 3/1889 | Gutzkow | 73/249 |
| 3,004,429 | 10/1961 | Granan et al. | 73/232 |
| 3,657,925 | 4/1972 | Gross | 73/239 |
| 3,877,287 | 4/1975 | Duntz, Jr. | 73/232 |
| 4,606,218 | 8/1986 | Chisman, III | 73/239 |
| 4,610,163 | 9/1986 | Johannesson | 73/250 |
| 4,718,267 | 1/1988 | Capper | 73/3 |
| 4,766,759 | 8/1988 | Cohrs et al. | 73/3 |
| 4,829,808 | 5/1989 | West | 73/3 |
| 4,996,869 | 3/1991 | Cohrs et al. | 73/3 |
| 5,111,682 | 5/1992 | Halpin | 73/3 |

FOREIGN PATENT DOCUMENTS

| | | | |
|---|---|---|---|
| 0838360 | 6/1981 | U.S.S.R. | 73/240 |
| 9108445 | 5/1991 | WIPO | 73/240 |

*Primary Examiner*—Hezron E. Williams
*Assistant Examiner*—George M. Dombroske
*Attorney, Agent, or Firm*—Jordan and Hamburg

[57] ABSTRACT

A small volume prover is disclosed which is compact and capable of obtaining highly reliable measurement, keeping a highly accurate base volume without being affected by temperature and pressure of fluid to be measured.

The prover includes a cylindrical outer housing having a fluid inlet and a fluid outlet spaced apart from each other, a cylindrical measuring conduit having both open ends and first and second sets of fluid ports radially made in a wall thereof and coaxially mounted within the outer housing and an annular wall mounted between the outer housing and the measuring conduit at the position between the measuring conduit open end and the first set of ports thereof to form an upstream annular passage and a downstream annular passage. During proving preparation a piston is restrained by a piston actuator provided in the outlet-side end of the outer housing to permit the fluid to pass through the annular passage. At the time of measurement start, the piston is released to run and a valve actuator provided at the inlet side acts as a slide valve to closed the first sets of fluid holes.

12 Claims, 6 Drawing Sheets

SMALL VOLUME PROVER

BACKGROUND OF THE INVENTION

The present invention relates to a small volume prover for proving accuracies of flow meters, and more particularly to a high precision small volume prover capable of proving flow meters without being affected by test fluid pressure and temperature.

Flow meter proving apparatuses are used for conducting periodical and/or optional characteristic tests of flow meters newly fabricated to use and flow meters currently used in lines so that they can measure flow rate at a reliable accuracy without the possible characteristic changes due to the influences of extrinsic factors such as temperature and pressure and also of intrinsic factors such as wearing of movable parts. The characteristic tests are conducted basically by two methods: one is called a calibrating system using a stationary proving apparatus to which a flow meter to be tested is connected, and the other is called a prover system by which a flow meter is proved by being mounted in a fluid system.

Since the above-mentioned prover method can conduct a characteristic test of a flow meter as mounted in a line at any time, it is used mainly for testing conjectural type flow meters, e.g. turbine meters.

Flow meter provers operate on such a common principal that a moving displacer such as a piston or ball travels simultaneously with fluid flow in a cylindrical conduit having a uniform cross-section and displace a known volume of fluid in a predetermined section thereof which is determined as the reference volume. In proving a flow meter by a prover, the corresponding metered volume simultaneously passes through the flow meter and the flow meter's readings, i.e. the whole number of pulses generated by the flow meter is counted to determine a K-factor(meter factor) representing a number of pulses per unit volume displaced. If needs be, a continuous flowrate characteristic curve is plotted on the basis of a K-factor calculated for a plurality of flowrate measurements.

To obtain a high resolution meter factor it is needed to increase a number of pulses generated per base volume over a certain number, for example, 10000 pulses for stationary prover having a large base volume. If the base volume is less than the above-mentioned one, the desired number of meter pulses can not be generated, but a number of clock pulses(time) generated for the period that a displacer such as a piston travels and displaces the base volume of fluid and meter pulses(time) generated directly before and after said duration can be used for determining therefrom a meter factor. Therefore, even in case a smaller number of meter pulses is generated, it is possible to use small type provers (hereinafter called small volume provers) which are portable.

The small volume provers are designed basically such that a movable piston travels through a certain section of a cylindrical measuring conduit of a constant cross-section connected in series with a flow meter to be tested and the flow meter reading is compared to the displaced volume of fluid.

The fluid volume is practically determined from the displacement of the piston. In proving, a plurality of test results are averaged and then a meter factor(K-factor) is determined on the basis of the average value.

For this reason, the piston reciprocates in the cylindrical measuring conduit by the number of flowrate measurements.

Having traveled a given distance in the cylindrical measuring conduit and completed a proving pass, the piston is returned to its initial position by means of a hydraulic or pneumatic actuator driving the piston through a piston rod against the fluid stream. In this case, fluid can pass the cylindrical measuring conduit or a by-path provided in parallel with the measuring conduit.

In case of the fluid passing through the measuring conduit, the piston to be returned by means of the actuator is provided with valve functions for closing the port during the proving pass and opening the port during returning. This method is, hereinafter, called an internal valve method.

In case of fluid passing through a by-path, a by-pass valve is provided to close and open the by-pass, respectively, during a proving pass and returning of the piston. Hereinafter, this method is called an outer valve method.

The Japanese laid open patent publication No. 153063/79 discloses a small volume prover of the internal valve type in which a piston (movable member) includes a poppet valve which is opened to allow only the fluid to pass therethrough while the piston is fixed in a non-measurement state, and is closed to force the piston to travel simultaneously with a fluid stream during a proving pass. However, the poppet valve is frequently operated and, consequently, its seat portion may rapidly wear. In case of small volume provers, fluid leakage through the piston assembly may give a significant influence to their measurement results and, therefore, the reliability of the poppet valve may directly concern the test results.

The Japanese laid open patent publication No. 173418/85 discloses a compact type flow meter prover which is of the external valve type.

FIG. 1 is a view for explaining a conventional small volume prover which includes an inlet pipe 81, an inlet 81a, a housing 82, a by-path 83, a by-pass valve 84, an actuator 85, an introducing portion 86, a displacer(piston) 87, a shaft 88, a main cylinder 89, a downstream portion 90, an outlet pipe 91, a spring 92, journal bearings 93, 94, a hydraulic cylinder 95, a hydraulic piston 96, detecting rod 97, a detecting unit 98, sensors 99, 100, 101, a detecting flag 102, a pilot 103 and a sleeve bearing 104.

The housing 82 is composed of a main cylinder 89 serving as a measuring cylinder, an introducing chamber 86 being larger in diameter than the main cylinder 89 and a downstream portion 90.

The introducing chamber 86 includes a hydraulic cylinder 95 therein and communicates with an inlet pipe 81 connected to the portion adjacent to the cylinder-mounted portion. A by-path of the housing 82 is composed of the inlet pipe 81, a by-pass pipe 83 and an outlet pipe 91 and includes a by-pass valve 84 therein between its inlet 81a and outlet 91a. A hydraulic cylinder 95 and the main cylinder 89 are coaxially arranged and a hydraulic piston 96, a shaft 88 and a displacer 87 are connected in series with each other to form a single member. The shaft 88 is liquid-tightly supported by a journal bearing 93. A spring 92 is provided between the journal bearing 93 and the displacer 87.

The displacer 87 is provided with a detecting rod 97 fixed thereto for detecting a travel of the displacer 87.

As shown in FIG. 1, the displacer 87 currently exists in the introducing chamber 86 of a large diameter and a detection flag 102 coexists with a sensor 99. With a by-pass valve 84 being closed, the fluid introduced through the inlet 81a and the inlet pipe 81 passes through the main cylinder 89 and is discharged through an outlet 91a of an outlet pipe 91. The displacer 87 rests and is ready to start travelling.

When a command to start measurement is given, a hydraulic piston 96 starts moving toward a downstream portion 90 (to the right) to move the displacer 87 with the aid of the spring 92. A base volume of fluid displaced from the cylinder 89 by the displacer 87 is determined as a travel distance of the detection flag between two sensors 100 and 101. The displacer 87 then stops when a pilot 103 extending axially from the displacer rests in a sleeve bearing 104. In this state, the fluid passes the downstream portion 90 of a large diameter and exits from the outlet 91a.

When the by-pass valve 84 is opened by the action of an actuator 85, the fluid passes through the by path 83 and is discharged from the outlet 91a. In this state the displacer 87 is returned to the shown starting position by means of the hydraulic piston 96.

In the above-described small volume prover of the external valve type, the displacer 87 with a seal 87a slidably moves in the main cylinder 89 with no fear of fluid leakage that is encountered in any prover of the internal valve type having a displacer provided with a poppet valve. However, since the main cylinder 89 is a single wall conduit precisely finished to have an uniform diameter, it can be deformed by the influence of temperature and pressure of the fluid. When fluid temperature is high, the main cylinder 89 may have a large difference of temperatures between its outer and inner surfaces that is also dependent upon the fluid temperature. Therefore, it is not easy to correct a change of volume in the main cylinder 89. In addition, a change of the fluid pressure may also change the reference volume of the small volume prover. Such a construction that the by-path line is externally connected to the main cylinder 89 for communication with the introducing chamber 86 and the downstream portion 90 is connected to the portion 90 makes it difficult to reduce the size of the prover.

SUMMARY OF THE INVENTION

The present invention, therefore, has as its primary object the provision of a small volume prover which is of small size and capable of conducting high reliable measurements without suffering affection of the fluid temperature and, particularly, the fluid pressure.

Another object of the present invention is to provide a small volume prover which is constructed so that a housing is in the form of a closed cylindrical vessel having an inlet and an outlet spaced from each other and containing a coaxially placed therein cylindrical measuring conduit which is supported on the housing inner wall by means of an annular wall to form an annular passage by separating an upstream side and downstream side and to allow the introduction of fluid through the inlet from a connected thereto flow meter to be proved and further its passing through the measuring conduit during a proving pass or through the annular passage during the time of non-measurement, thereby keeping a constant temperature of the fluid stream and maintaining a constant base volume of the measuring conduit by minimizing a differential pressure of fluids in and around said measuring conduit.

Another object of the present invention is to provide a small volume prover which comprises a closed cylindrical housing having an inlet adjacent to one closed end and an outlet adjacent to the other closed end; a cylindrical measuring conduit of a constant inside diameter with an open inlet-side end and an outlet-side end coaxially laying on an inner wall end of the cylindrical housing and having three rows of radially arranged ports, which are provided at a certain axial distance in the wall thereof; a sealed annular wall dividing an annular passage formed between the housing and the measuring conduit into an open-end side annular space and an annular chamber including the inlet-side ports of the measuring conduit; a slide valve having a valve rod sealably passing through the inlet-side end of the housing, which is slidably movable near the open end of the measuring conduit to open and close the inlet side slotted holes; a piston having a piston rod sealably passing through the outlet-side end of the housing, which is movable in the downstream side from the inlet-side ports to displace the base volume of fluid in the section defined between a row of the inlet-side ports and a row of the outlet-side ports; a valve actuator for driving the slide valve through the valve rod to close the inlet-side ports only during a proving pass; a piston actuator which acts on the piston rod so as to hold the piston near the position of the inlet-side ports for the time of proving preparation, to make the piston movable for the time of a proving test and to return the piston to its starting position; and a position sensor included in the piston actuator for detecting the piston passing the difined section of the measuring conduit.

DESCRIPTION OF THE PREFERRED EMBODIMENTS

Figure 1:
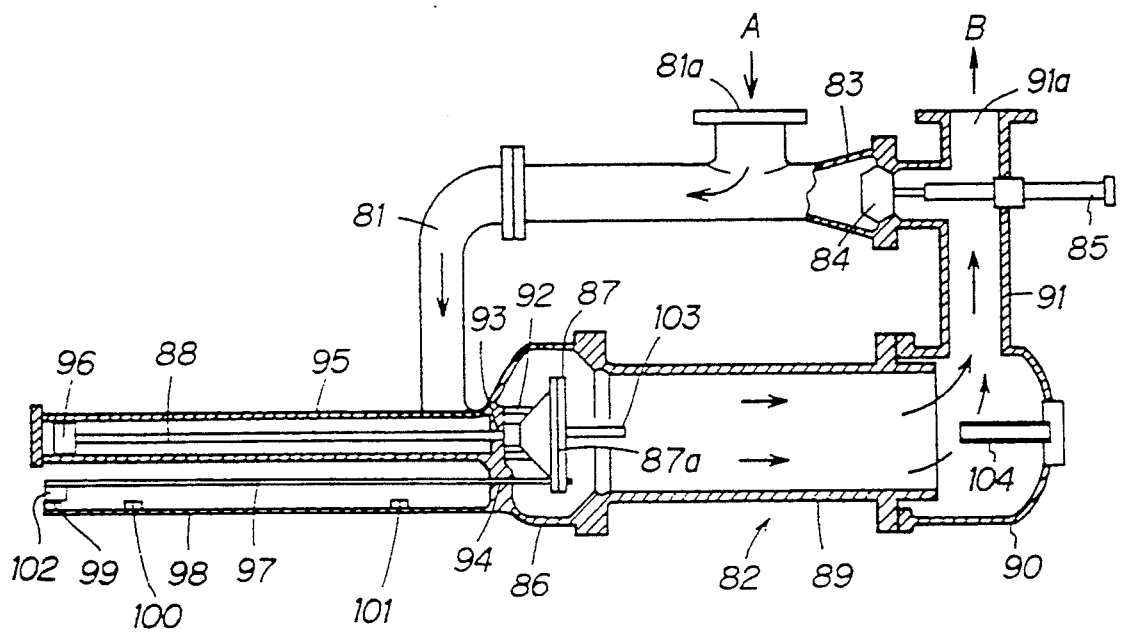
FIG. 1 is a view for explaining a conventional small volume prover.
Figure 2A:
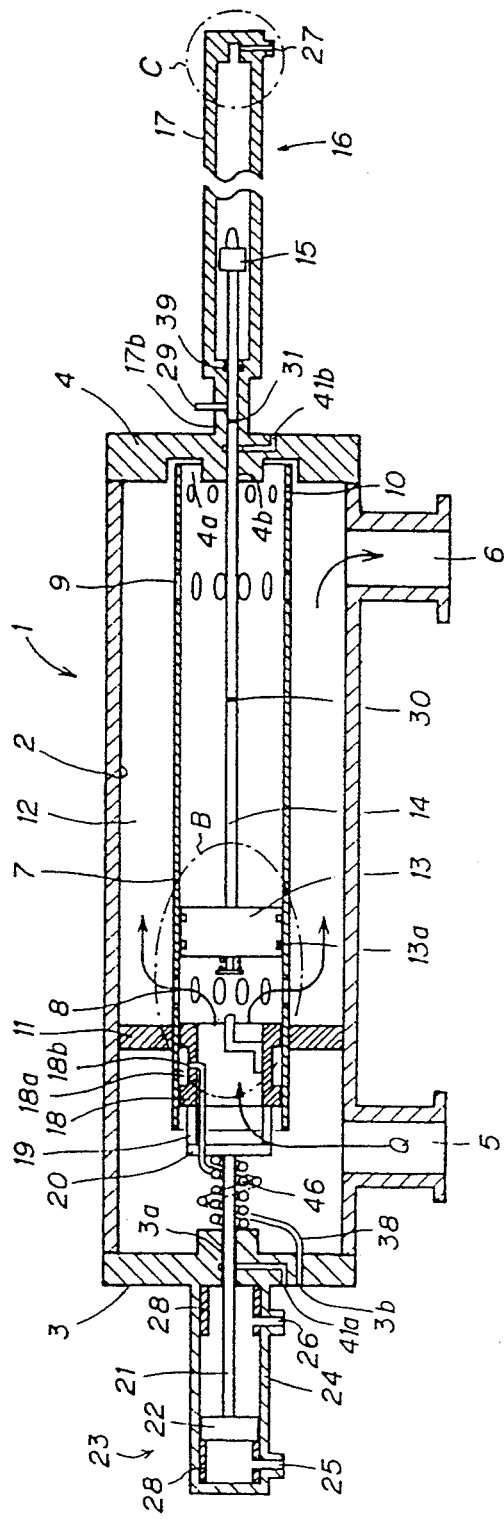
FIGS. 2(a)-2(c) are views for explaining a small volume prover embodying the present invention.

Referring to FIGS. 2(a),(b),(c), there are shown, respectively, a general view of a small volume prover embodying the present invention, an enlarged view of portion B of FIG. 2(a) and an enlarged view of portion C of FIG. 2(a). In the drawings, there are indicated a cylindrical body 1, an outer housing 2, an inlet-side end plate 3, an outlet-side end plate 4, a concaved ring portion 4a, an inlet 5, an outlet 6, a cylindrical measuring conduit 7, upstream slotted holes 8, downstream slotted holes 9, pressure relieving holes 10, an annular wall 11, an annular passage 12, a piston 13, a piston rod 14, a cushion 15, a piston actuator 16, a cylinder 17, a concaved portion 17a, a slide valve 18, an annular groove 18a, a through hole 18b, a support column 19, a supporting plate 20, a valve rod 21, a driving piston 22, a valve actuator 23, a cylinder 24, pressure supply ports 25, 26, 27 a stopper 28, a position sensor 29, markers 30, 31, a flexible tube 38, air ports 41a, 41b, and a spring 46.

In FIG. 2(a), a cylindrical body 1 is a closed cylindrical vessel composed of an outer housing 2, an inlet-side end-plate 3 and an outlet-side end-plate 4. A fluid inlet 5 and a fluid outlet 6 are provided in the wall of the outer housing 2 adjacent to, respectively, the inlet-side end-plate 3 and the outlet-side end-plate 4 thereof. Coaxially mounted within the cylindrical body 1 is a cylindrical measuring conduit 7 having both open ends which serves as a vessel of reference volume and, therefore, is precisely finished to be of a constant inside diameter over all length. The three rows of ports are radially made in the wall of the measuring conduit: Upstream ports 8 near the inlet-side open-end, downstream slotted holes 9 at the downstream side and pressure relieving ports 10 near the opposite end of the conduit. An annular wall (ring) 11 is mounted within the measuring conduit 7 which is supported near the upstream open end (before the upstream holes) by an affixed thereto annular wall 11 which divides the annular passage 12 formed between the cylindrical body 1 and the measuring conduit 7 into an upstream section and a downstream section. Therefore, the reference volume measuring portion of the measuring conduit 7, which lies between the upstream ports 8 and the downstream slotted holes 9, is free from mechanical and thermal distortion through the annular wall 11 and the cylindrical body 1. Consequently, the measuring conduit 7 forms a constant and accurate base volume of measuring portion being free from external influence. The cylindrical body 1 with the integrally mounted therein measuring conduit 7 is hereinafter called the "main body" of the small volume prover.

A piston 13 is slidably mounted within the measuring conduit 7 and is provided with piston seal means 13a near its both ends. This piston 13 is a movable fluid barrier which, in the operation of the prover, is forced by meter fluid pressure to travel downstream to displace the base volume fluid in the measuring portion of the conduit. The piston 13 is formed integrally with a piston rod 14 and a cushion 15. The piston rod 14 is a moving member of a plunger type hydraulic unit provided at the outlet-side end-plate 4 and acts as driving part of a piston actuator 16 which has functions to hold the piston 13 at rest or to return it to the original position by opening or closing a pressure inlet 27 (valve means not shown), for example, by leading or discharging pressurized fluid into or from a cylinder 17. In the operation of the prover, the piston 13 travels downstream (toward the downstream slotted holes 9) in the measuring conduit in synchronism with the fluid flow. After the piston 13 passes the downstream slotted holes 9, the fluid is immediately discharged through the pressure relieving ports 10, and thereby piston 13 smoothly decelerates to stop without any abrupt mechanical shock. The ports 10 are smaller than the upstream slotted holes 8 and the downstream ports 9. The set of the downstream slotted holes 9 and the set of the pressure relieving ports 10 are arranged at such a distance therebetween that the piston 13 starts covering the pressure relieving ports 10 as soon as the piston 13 passed the downstream slotted holes 9. However, since a total open area of the pressure relieving ports is constant, the cushion effect varies depending on flowrate and the piston 13 may suffer an excessive force if no additional means is provided. For this reason, a cushion member 15 is provided which eliminates the possibility of applying an excessive stress on the piston 13.

Figure 2C:
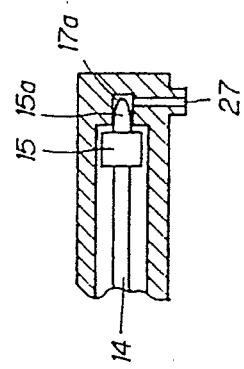

In FIG. 2(c), there are shown a cushion member 15 having a tapered spindle end 15a and a concave 17a provided within an internal end plate of a cylinder 17. The concave 17a has a constant cross-section substantially corresponding to the cross-section of the root of the spindle end 15a. As the piston rod 14 approaches to the end plate of the cylinder 17, the fluid passage in concave 17a becomes narrower to increase flow resistance of the fluid to be discharged through the concave 17a producing the cushioning effect to the piston rod 14 which is liquid-tightly supported by a journal bearing 4b mounted in the outlet-side end-plate 4 of the cylindrical body 1. The journal bearing 4b has an air passage communicating with an air port 41b in the outlet-side end-plate 4, thereby preventing the measuring fluid from flowing into the cylinder 17 of the piston actuator 16. In contrary to the case shown in FIG. 2, it is also possible to form a concave 17a in the end face of the cushion member 15 and attach a tapered spindle 15a to the end plate of the cylinder 17.

Between the piston actuator 16 and the main body of the small volume prover is placed a sensor mounting pipe 17b in the wall of which a position sensor 29 is mounted for detecting the location of the piston 13. Since the prover main body contains the measuring fluid and the piston actuating cylinder 16 produces therein high hydraulic pressure, the position sensor 29 in the wall of the mounting pipe 17b may be subjected to an abnormal high pressure if the fluid leaks therein from either the main body or actuating cylinder. The provision of the above-mentioned air port 41b and a seal member 39 in the front and the rear, respectively, of the sensor mounting pipe 17b prevents the abnormal high pressure leakage therein. The position sensor 29 may be of electromagnetic, optical or any other type that can accurately detect the travel of the piston 13 for displacing the base volume of the measuring fluid. In FIG. 2, two markers 30 and 31 are made in the form of ring grooves at specified positions, respectively, of the piston rod 14. When the sensor 29 detects each of markers 30 and 31 on the piston rod 14, it emits an electromagnetic signal representing a given location of the piston 13.

In the other hand, in the measuring conduit 7 adjacent to the upstream open-end thereof is mounted a slide valve 18 which can slide therealong in the axial direction to close the upstream ports 8 in the wall of the measuring conduit. The slide valve 18 is connected with a supporting column 19, a supporting plate 20 and a valve rod 21 in said turn. The valve rod 21 has at its end a driving piston 22 which is drivable to move in the axial direction by a valve actuator 23 mounted on the inlet-side end 3 of the cylindrical body 1. The stroke of the slide valve 18 is limited by stop rings 28 and mounted within a cylinder 24 of the valve actuator at the opposite ends respectively. The slide valve 18 is open when the piston 22 abuts one of the stop rings 28, and it is closed when the piston 22 abuts the other stop ring 28. Provision of an annular groove 18a in the slide valve 18 allows uniform application of fluid pressure on the periphery of the valve body, thereby achieving smooth opening and closing operations of the slide valve 18. The valve actuator 23 actuates under the pressure of fluid such as hydraulic operating oil to be supplied and discharged through pressure ports 25 and 26. The valve rod 21 is supported by a liquid-tight journal bearing 3a mounted on the inlet-side end-plate 3 of the cylindrical body 1. An air port 41a prevents the pressurized actuating fluid from leaking into the prover main body.

A through hole 18b provided in the annular groove 18a of the slide valve 18 and a through hole 3b provided in the inlet-side end-plate 3 of the cylindrical body 1 are connected by means of a flexible tube 38 to which a pressure detecting means (not shown) is attached for detecting a fluid leakage through the slide valve 18. Prior to the prover operation, fluid leakage through the slide valve 18 is checked by monitoring the pressure in the tubing 38 so as to predict the possible measurement error due to the fluid leaking into the annular passage 12 through the slide valve 18 during the proving test with the valve closed.

A spring 46 is mounted on the valve rod 21 between the journal bearing 3a and the supporting plate 20 and acts to apply a force to the slide valve 18 for compensating for a delay due to an inertia force of the valve 18 when the valve rod 21 is driven by the valve actuator 23.

As shown in FIG. 2(a), the piston 13 is now locked by the piston actuator 16 and, as shown by arrows "Q", measuring fluid entered into the cylindrical body 1 through the inlet 5 passes through the slide valve 18 and the upstream ports 8 and enters into the annular passage 12, bypassing the measuring conduit 7, and then the fluid exits from the outlet 6. When the slide valve 18 is driven into downstream movement and starts covering the upstream ports 8, the fluid flow into the annular passage 12 is decreased, thereby increasing the upstream pressure against the piston 13 in the measuring conduit 7. This is explained as follows. Even when the valve actuator 23 actuates in synchronism with releasing the pressure port 27 of the piston actuator 16, a delay of the piston operation occurs by the effect of mass and sliding friction of the piston 13 and flow resistance by restriction. This pressure increase induces an excessive speed change of movement of the piston 13.

Figure 2B:
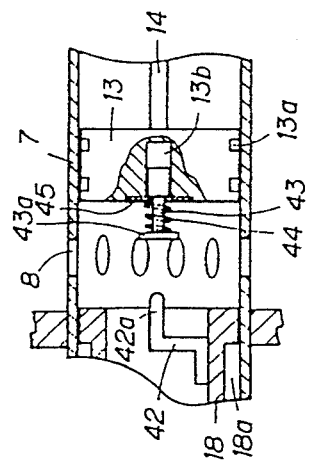

Referring now to FIG. 2(b), there is shown a detailed view of a mechanism for equalizing piston motion according to the present invention. In FIG. 2(b) there are shown guide hole 13b, pushing member 42, a protrusion 42a, a receiving member 43, a flange 43a, a spring 44 and a pressure plate 45.

The pushing member 42 is mounted integrally within the slide valve 18 and has a protrusion 42a projecting coaxially in the downstream direction. The guide hole 13b is provided coaxially in the upstream end of the piston 13. The receiving member 43 has the flange 43a at its top and is loosely inserted in the guide hole 13b and locked to the upstream end of the piston 13 by means of the pressure plate 45 and the spring 44 mounted on the member between the flange 43a and the pressure plate 45. When no measurement is conducted, the piston 13 is positioned with a small spacing between the protrusion 42a of the pushing member 42 and the flanged end 43a of the receiving member 43. When the slide valve 18 is moved to the specified position to start closing the upstream ports in the measuring conduit, the protrusion 42a of the pushing member 42 abuts the flanged end 43a of the-receiving member 43. Further movement of the slide valve 18 starts the piston 13 to move slowly by the action of the spring 44, thereby eliminating the above-mentioned pressure rise and achieving that the piston 13 moves at a constant speed with the meter fluid flow.

Figure 3A:
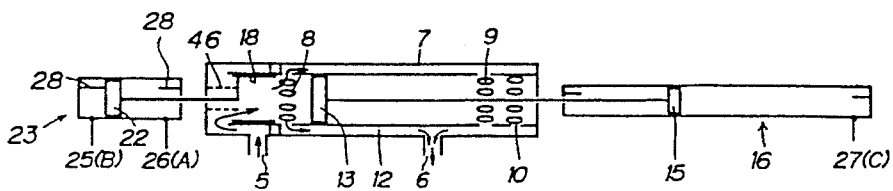
FIGS. 3(a)-3(g) are schematic views for explaining the operating sequence of the small volume prover of the present invention.
Figure 3B:
Figure 3C:
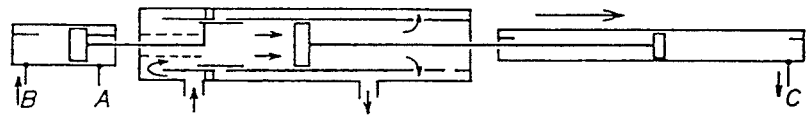
Figure 3D:
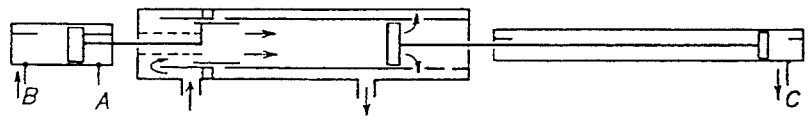
Figure 3E:
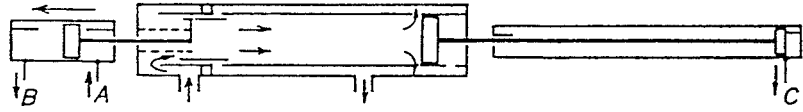
Figure 3F:
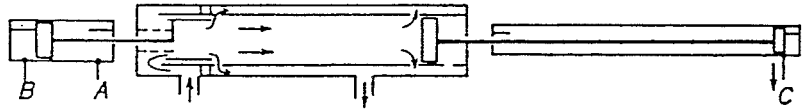
Figure 3G:
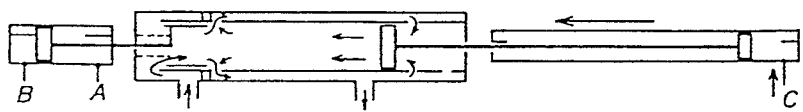

Referring now to FIGS. 3(a) through 3(g), the operating sequence of the small volume prover according to the present invention will be described as follows:

FIG. 3(a) shows the prover when preparation for proving (II) is completed (with the piston in starting position); FIG. 3(b) shows the prover when a proving pass starts; FIG. 3(c) shows the prover when a proving pass is conducted; FIG. 3(d) shows the prover when a proving pass is completed; FIG. 3(e) shows the prover when preparation (I) starts (returning the slide valve); FIG. 3(f) shows the prover when preparation (I) is finished (with the slide valve in the opened position), and FIG. 3(g) shows the prover when the preparation (II) began (returning the piston to the starting position). While the prover is illustrated, for convenience of explanation, as separated into three portions—the valve actuator 23, the measuring cylinder 7 and the piston actuator 16, its operating sequence is the same as that of the prover shown in FIG. 2. Therefore, the like elements are given like reference numbers as shown in FIG. 2. In the operating sequence description, pressure ports 25, 26 of a valve actuator 23 and a pressure port 27 of the piston actuator 16 will be indicated as ports A,B and C respectively. In FIGS. 3(b) through 3(g), no reference character is given. A flow meter to be proved (not shown) is connected in series to a fluid inlet 5.

(a) Preparation (II) has been completed (the prover is ready to start proving).

Pressurized hydraulic fluid enters the valve actuator 23 through the port A while the port B is in an open position. An actuating piston 22 stops at the side of the port B and the slide valve 18 opens inlet-side slotted holes 8.

In the above-mentioned condition, pressurized hydraulic fluid is introduced into the piston actuator 16 through the port C to lock the actuating piston 15. The piston 13 stops at the downstream position adjacent to the radial row of the upstream ports 8 in the measuring conduit 7. Fluid from the flow meter enters the prover body through the inlet 5 and flows through the open end of the measuring conduit 7, the upstream ports 8 and an annular passage 12, bypassing the piston 13, and then it exits from an outlet 6. The fluid to be measured and the measuring conduit 7 thus have the same temperature. Only a small difference of pressures of the fluids in and out of the measuring conduit 7 will be produced.

(b) A proving pass starts.

Pressurized hydraulic fluid enters the valve actuator 23 through the port B while the port A is in an open position. The actuating piston 22 moves in the direction indicated by an arrow and the slide valve 18 begins covering the inlet-side ports 8 in the measuring conduit 7. At the same time the port C of the piston actuator 16 is opened and the slide valve 18 energizes the piston 46 by the force of a spring 46 so as to compensate the delay in its motion due to inertia force, thereby achieving the rapid movement of the slide valve 18 and the piston 13-at a constant speed. When the slide valve 18 closes the inlet-side ports, flow ceases in the annular passage 12 and the entire fluid stream enters the measuring conduit to put the piston 13 into a proving pass.

(c) A proving pass being conducted;

In the state that pressurized hydraulic fluid enters the slide valve 23 through the port B while the port A is kept open, the actuator piston 22 stops at the side of the port A. Accordingly, the slide valve 18 entirely closes the inlet-side ports 8 in the measuring conduit 7.

The piston actuator 16 keeps the port C in open position. Fluid to be measured flows only in the measuring conduit 7, causing the piston 13 to move downstream and, therefore, the downstream fluid to flow through the downstream ports 9 and 10 and exits from the outlet 6. Accordingly, the measuring conduit 7 maintains the same conditions on fluid temperature and pressure as those of the step (a) "preparation for proving". The measured volume of fluid is compared with the base volume of the measuring fluid displaced for one proving pass of the piston 13, which is defined by two position markers 30 and 31 provided on the piston rod 14.

(d) A proving pass is finished.

The valve actuator 23 keeps the ports A and B in the same conditions as described above in step (c).

The fluid stream causes the piston 13 to moves toward the downstream end-plate 4, passing through the downstream ports 9. The fluid exits from the pressure relieving ports 10 and the actuating piston 15 of the piston actuator 16 stops near the port C in the measuring conduit. A proving pass is completed.

(e) Preparation (I) is started (to return the slide valve to the initial position).

Pressurized hydraulic fluid enters the slide actuator 23 through the port A while the port B is released. The slide valve 18 begins to move compressing the spring 46. The piston actuator 16 remains in the same position to that of step (d) "a proving pass is completed". The fluid to be measured flows in the measuring conduit 7, passes through the downstream ports 9 and exits from the outlet 6. The fluid continues flowing in said route until the upstream ports are opened.

(f) Preparation (I) is finished (with the slide valve being in the opened position).

The pressurized hydraulic fluid enters the valve actuator 23 through the port A, keeping the port B in opened position. The slide valve 18 is fully opened. The piston actuator 16 is in the same condition as that of step (d) "a proving pass is completed". The fluid to be measured is divided into two streams: one flows through the measuring conduit 7 and the other flows through the annular passage 12. Then both streams join together to exit from the outlet 6.

(g) Preparation (II) begins (returning the piston to the starting position).

The pressurized hydraulic fluid enters the valve actuator 23 through the port A, keeping the port B in opened position. The slide valve 18 is fully opened.

The pressurized hydraulic fluid enters the piston actuator 16 through the port C, causing the piston 13 to move toward the upstream slotted holes 8 in the measuring conduit 7.

The fluid flowing downstream in the measuring conduit 7 is pushed back by piston 13 and then passes through the upstream ports 8 to flow downstream in the annular passage 12. A part of the fluid flow in the annular passage 12 enters into the measuring conduit through the downstream slotted holes 9 and the other part exits from the outlet 6.

The prover will repeat the above-mentioned steps (a) through (g) of its operating sequence.

While in the above-mentioned sequence the slide valve 18 axially moves to close or open the upstream slotted holes 8 in the wall of the measuring conduit 7. Such a modification is also effective that the slide valve 18 turns radially in the measuring conduit to close or open the upstream slotted holes 8 in the conduit wall.

Figure 4A:
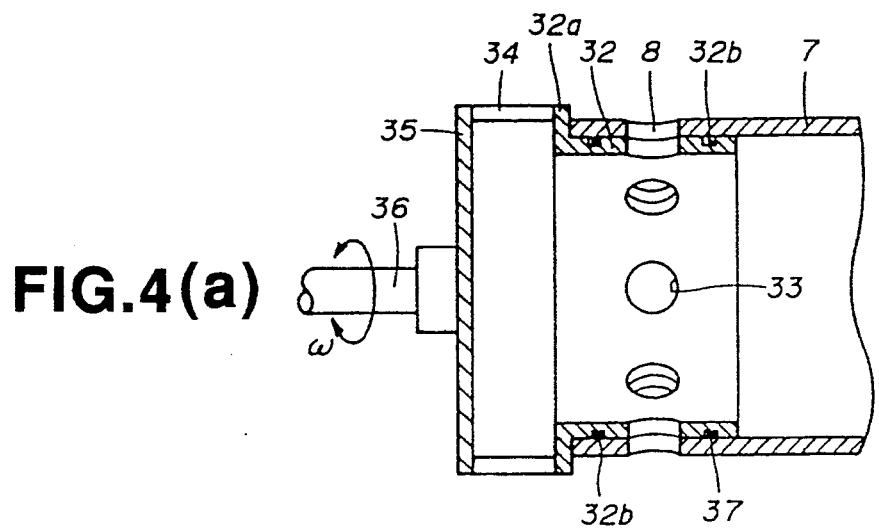
FIGS. 4(a)-4(c) are views for explaining another example of, a slide valve for the small volume prover of the present invention.
Figure 4B:
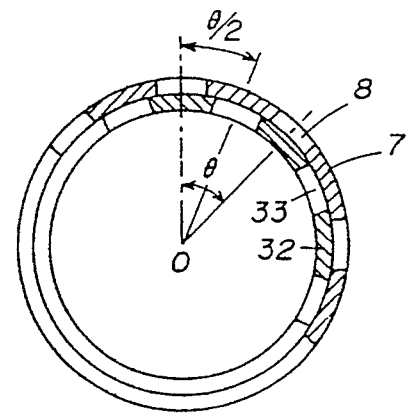
Figure 4C:
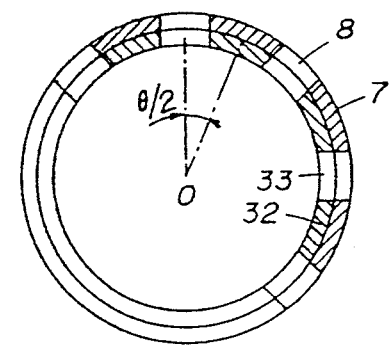

FIGS. 4(a),(b) and (c) are views for explaining another modified slide valve for use in the small volume prover according to the present invention: FIG. 4(a) is a side view of the slide valve, FIG. 4(b) shows the valve in closed position and FIG. 4(c) shows the valve in opened position. In the drawings, in which elements similar in function to those shown in FIG. 2 are denoted by the same reference numerals, there are shown: a rotatable slide valve 32, a flange 32a, a groove 32b, a circular port 33, a supporting column 34, a supporting plate 35, an actuating rod 36, and O-rings 37.

The rotatable slide valve 32 has an outside diameter substantially corresponding to the inside diameter of the measuring conduit 7 and is slidable therein. A plurality of ports 33 is provided radially in the wall of the rotatable slide valve. Said ports 33 are the same or smaller in diameter than the upstream ports 8 in the wall of the measuring conduit 7. Both sets of ports 33 and 8 are drilled at the same pich $\theta$ in the respective walls. The flanged end 32a of the rotatable slide valve 32 is effective for correctly positioning the valve 32 within the measuring conduit 7 in such a way that the ports 33 and the ports 8 correctly meet each other in the axial direction. The O-rings 37 are fitted in the grooves 32b formed on the periphery of the valve 32 to prevent fluid leakage.

Within the measuring conduit 7 the rotatable slide valve 32 can be reversibly turned by an angle $\theta/2$ in directions indicated with arrows w by means of the actuating rod 36 which is connected to the valve 32 via the supporting plate 35 and the supporting column 34 affixed to the valve's flanged end 32a. Turning the valve is conducted by turning the actuating rod 36 from a conventional hydraulic motor (not shown) mounted on the inlet-side end-plate 3 of the prover body.

FIGS. 4(b), 4(c) show the rotatable slide valve 32 in cases, respectively, of closing and of opening the upstream ports 8 in the wall of the measuring conduit 7. The smaller a pitch angle $\theta$ is, the faster a valve can close or open the ports. In case of a large flowrate prover it is useful to increase effective opening area by forming axially elongated ports 31 and 8. Seal means (not shown) are provided between the valve 32 and the measuring conduit 7 at both sides of the rows of ports 31 and 8 to prevent fluid leakage therethrough.

In the small volume prover described above with reference to FIG. 2, the cylindrical body 1 is a vessel closed with the inlet-side end-plate 3 and the outlet-side end-plate 4. Means for mounting the measuring conduit 7 within the cylindrical body 1 will be described in detail with reference to FIG. 4.

Figure 5:
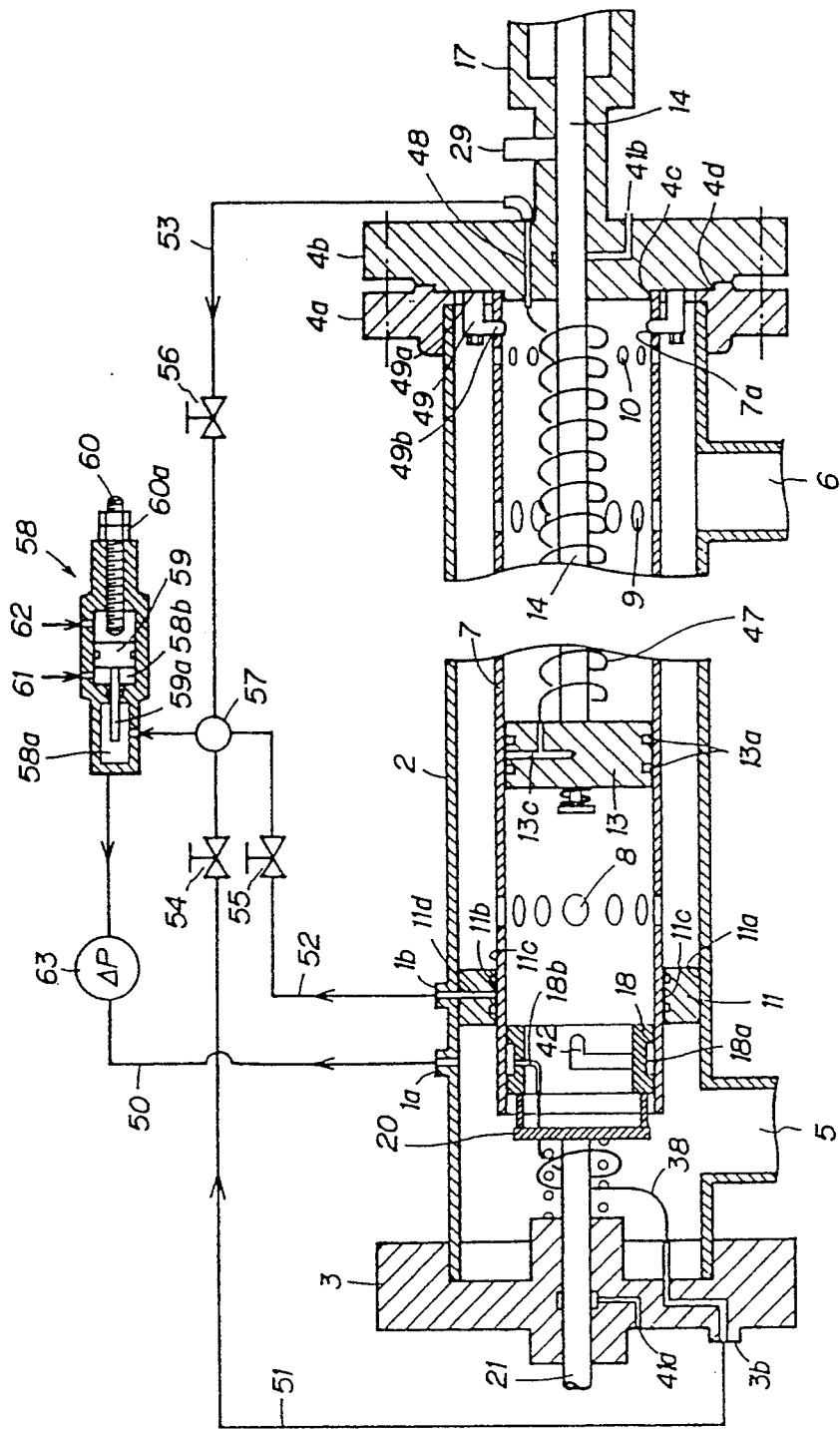
FIG. 5 is a view for explaining another example of a small volume prover embodying the present invention.

FIG. 5 is a view for explaining another small volume prover embodying the present invention, wherein elements similar in function to those shown in FIG. 2 are denoted by the same reference numerals. In FIG. 5, there are shown: a pressure inlet 1a, a pressure port of an annular passage 1b, an inner flange 4a, an outer flange 4b, a flexible tube 47, a through hole 48, a locking device 49, pressure pipes 50, 51, 52, 53, valves 54, 55, 56, a connecting portion 57, a differential pressure generator 58, a piston 59, a regulating rod 60, pressure ports 61, 62 and a differential pressure gauge 63. An outlet-side end 4 is composed of an inner flange 4a and an outer flange 4b which are coaxially coupled together at their fitting portions 4d and tightly connected with each other with bolts (not shown). The inner flange 4a is also securely fitted at its recess on the outlet-side end of an outer housing 2. The outer flange 4b has a guide ring 4c coaxially formed on its inner end surface, on which an outlet-side end of a measuring conduit 7 is fitted. The measuring conduit 7 has a plurality of locking holes 7a provided radially in wall near its outlet-side end fitted on the guide ring 4c. A plurality of L-shaped locking blocks 49 are secured with bolts at their bottom 49a to the inner surface of the outer flange 4b in such a way that their L-shaped fingers are inserted in the corresponding locking holes 7a in the outlet-side end of the measuring conduit 7. The measuring conduit 7 is now mounted coaxially within the outer housing 2 by means of inner and outer flanges 4a and 4b. An annular wall 11 is secured at its outer cylindrical surface 11a to the outer housing 2 and not secured at its inner cylindrical surface 11c to the measuring conduit 7 so as to permit easy insertion of the measuring conduit 7 into the outer housing 2. Sealing members 11b such as O-rings are mounted in grooves formed on the inner cylindrical surface 11c of the annular wall 11 near both wall surfaces 11a, respectively, to prevent leakage therethrough.

Any type of small volume provers requires the provision of reliable prevention of fluid leakage because its base volume is small and during a proving test leaking fluid flows as bypass flow of the base volume, causing measuring errors. However, since during the proving run of a small volume prover differential pressure may be produced permitting fluid leakage, it is essential Go provide the prover with means for checking for integrity of its seals so as to assure the reliability of the measurements.

The small volume prover according to the present invention requires checking for possible leakage through seals for the slide valve 18, the inner cylindrical surface of the annular wall 11, and the internal and the external wall surfaces of the measuring conduit 7 on which the piston 13 slides. According to the present invention, such a method for checking for leakage and determining the extent of leakage is adopted in which pressure along a sliding surface to be checked is reduced by a certain value, the reduced pressure is compared with the standard pressure and a check is made whether the reduced pressure is recovered to the standard value (by leaking fluid) or not (no leakage).

A differential pressure generator 58 receives pressurized fluid from the portion to be checked and reduces the fluid pressure along the sliding surface by a certain value. The generator 58 is composed of a closed type pressure reducing chamber 58a and an actuating chamber 58b which includes a piston 59 movable in the axial direction under the pressure of fluid introduced through pressure inlets 61 or 62; and a plunger 59a connected with the piston 59 and capable of liquid-tightly moving in and out of the pressure reducing chamber 58a and retarding therefrom. As soon as the fluid enters the pressure reducing chamber 58a, the piston 59 actuates to retract the plunger 59a, thereby pressure of the fluid in the chamber 58a is reduced by the volume of expansion therein. The reduced pressure is compared to the standard pressure by the differential pressure gauge 63. In case of FIG. 5, the standard pressure is of the fluid which enters the prover through the inlet 5 and exits from a pressure port 1a and then is supplied through piping 50 to the gauge 63. Pressure adjusting rod 60 has a thread and can be screwed into the actuating chamber 58b to restrict the stroke length of the piston 59, thereby adjusting the differential pressure value in the pressure reducing chamber 58a. After completion of adjustment the adjusting rod 60 is locked with a nut 60a. While in case of FIG. 5 the plunger 59a is driven by means of a pressure actuator, it is also possible to use electrical means such as an electromagnetic device, piezoelectric device or the like.

Portions to be checked for possible leakage are the slide valve 18, the annular wall 11 and the piston 13.

The slide valve 18 is provided with a pressure leading system consisting of a flexible tube 38, a through passage 3b and a pressure leading tube 51 connected to a connection box 57.

The annular wall 11 includes an inner through passage having an opening at the inner cylindrical surface 11c between two seals 11b and 11b and an opening at the outer cylindrical surface 11d. This passage mates with a pressure port 1b in the wall of the outer housing 2 and a pressure leading tube 52 is connected at one end to the port 1b and at the opposite end to the connecting box 57.

The piston 13 includes an internal through passage 13c having an opening at the periphery between two seals 13a and an opening at the inside surface, which is connected by a flexible tube 47 to a through passage 48 in the outer flange 4b. A pressure leading tube 53 is connected at one end to the through passage 48 and at the other end to the connecting box 57.

These pressure leading lines through the connection box 57 terminate at the pressure reducing chamber 58a of the differential pressure generator 58. The lines 51, 52 and 53 are provided with valves 54, 55 and 56, respectively, which makes it possible to selectively connect any of the pressure leading lines for checking fluid leakage in the slide valve 18, the annular wall 11 or the piston 13. Checking the slide valve 18 for leakage is conducted prior to the proving test for the purpose of preliminarily determining the possibility of leakage through the slide valve.

The slide valve 18 driven by the actuator 23 is frequently operated to open and close the upstream slotted holes 8 in the wall of the measuring conduit, causing a sealing member (not shown) to wear and be damaged. Easy replacement of the sealing members for the slide valve is, therefore, highly required for a long time. The small volume prover according to the present invention includes the upstream end plate 3 allowing easily removing the slide valve. The mechanism of said end plate will be described below.

Figure 6A:
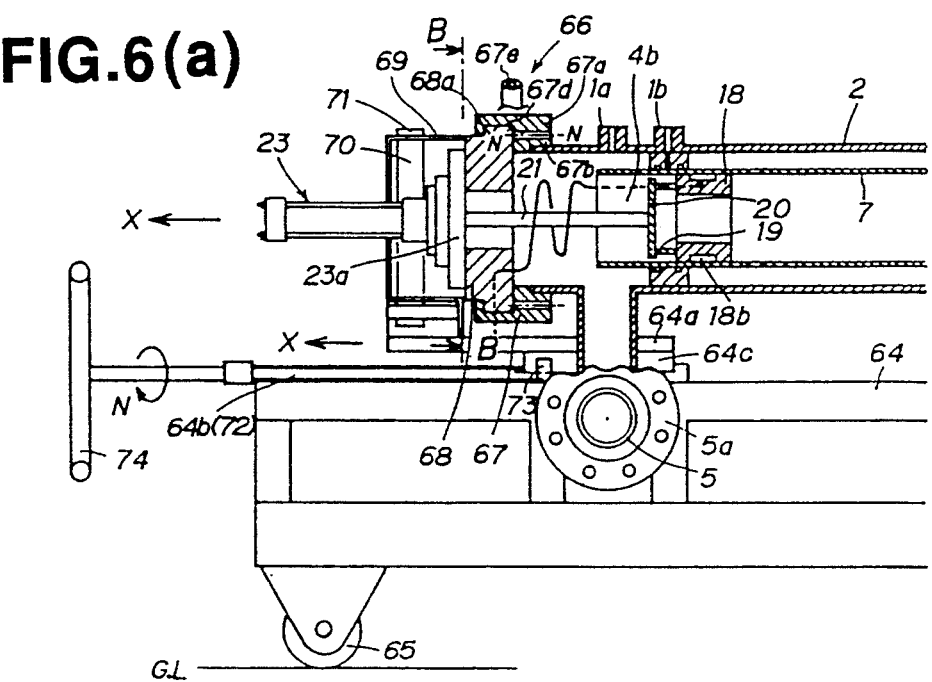
FIGS. 6(a)-6(c) are views for explaining a further example of a small volume prover of the present invention.
Figure 6B:
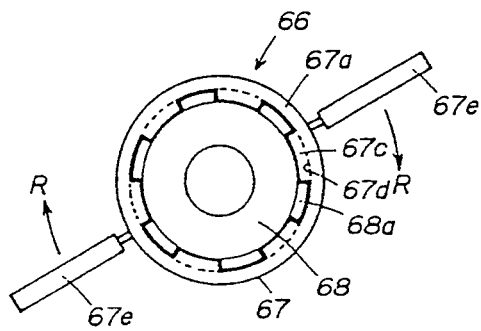
Figure 6C:
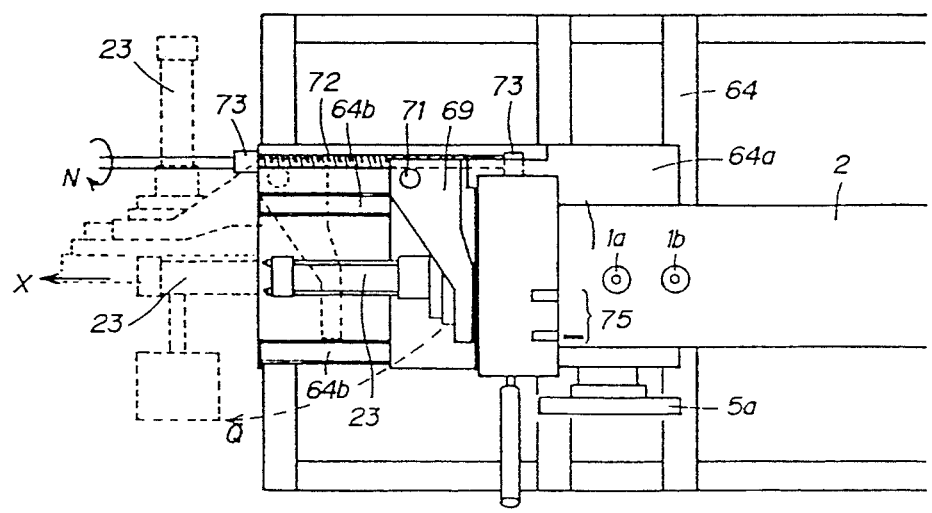

FIG. 6 is a view for explaining a further modified small volume prover according to the present invention: FIG. 6(a) is a sectional view of a concerned portion; FIG. 6(b) is a cross-sectional view taken along line B—B in FIG. 6(a); and FIG. 6(c) is a plan view of the portion shown in FIG. 6(a). In FIGS. 6(a), 6(b) and 6(c), wherein elements similar in function to those shown in FIG. 2 are denoted by the same reference numerals; there are shown a frame 64, a platform 64a, rails 64b, a guide channel 64c, a wheel 65, a clutch door 66, a movable outerside ring 67, a fixed innerside ring 68, a holding frame 69, an axial pin 70, a screw shaft 72, a screw bearing 73, a handle 74 and an index 75.

The body of the small volume prover is mounted on a frame 64 having wheels 65. Two parallel rails 64b are fixed on the frame 64 in the axial direction of a measuring conduit 7 thereon. On the rails 64b are slidably mounted guide channels 64c, one on each rail, respectively, which can move therealong in the direction X being driven by a screw shaft 72 which is rotated by turning a handle 74 removably attached thereto. The guide channel 64c bears a holding frame 69 to which a clutch door 66 is attached.

The clutch door 66 is composed of a rotatable outerside ring 67 and a fixed innerside ring 68 which is removable from the outerside ring 67. The rotatable outerside ring 67 is consisted of a rotatable ring 67a and a fixed ring 67b: the fixed ring 67b being coaxially welded to the end plate of the outer housing and the rotatable ring 67a is integrally constructed with the fixed ring 67b so as to be rotated along line N—N of the periphery of the fixed ring 67b. The rotatable ring 67a has therein an annular groove 67d having a plurality of fingers formed at equal intervals on an outer frame portion thereof, while the fixed inner ring 68 has fingers 68a, each being so sized in width to pass between two fingers 67c of the annular groove 67d. When the rotatable ring 67a is turned in the direction indicated by arrows R by use of the removable handle, its finger 67c in-phasely engages the finger 68a of the fixed inner ring 68 at the position of the annular groove 67d of the rotatable outerside ring 67. In this time the fixed innerside ring 68 and the rotatable outerside ring 67 are liquid-tightly sealed therebetween (not shown).

In FIG. 6(b), the clutch door is unlocked, wherein the fixed innerside ring 68 is movable in the direction of arrow X in FIG. 6(a) to be separated from the rotatable outerside ring 67. The fixed innerside ring 68 has a flange 23a to which is secured an actuator 23 integrally connected with a slide valve 18. The screw shaft 72 is rotated until the slide valve 18 is separated apart from the rotatable ring 67a and then the slide valve 18 is turned by 90° about a shaft pin 71 of a supporting column 70 provided the holding frame 69 in the direction indicated by arrow Q, whereby the valve 18 is placed in the position allowing easier repairing of its seals. After any repair work is completed the clutch 66 of the door can be locked by reversing the above-mentioned steps.

As is apparent from the foregoing description, the small volume prover according to the present invention has the following features and advantages:

(1) The main body of the small volume prover is a closed cylindrical vessel having a fluid inlet and an fluid outlet spaced apart from each other and includes a coaxially mounted cylindrical measuring conduit and an annular wall dividing annular space formed between the measuring conduit and the outer housing into an upstream passage and a downstream passage. A flow meter to be proved is connected in series to the fluid inlet of the prover. Fluid entering the prover body through the inlet flows through the annular passage, when no proving is conducted, and flows within the measuring conduit only when proving is conducted, so keeping the measuring conduit at a temperature of the measuring fluid. Furthermore, there is only a little difference of pressures across the wall of the measuring conduit, whereby the measuring conduit may always maintain a constant and accurately repeatable standard volume.

As mentioned above, the measuring conduit is free from pressure influence and, therefore, is not required to have a thick wall for protection against pressure distortion. It may be a precision cylinder having both open ends, which is easily machined at high accuracy of its volume and also at low cost. Since a slide valve for achieving preparation and start is mounted within the prover body, the necessity of providing a by-pass line out of the prover is eliminated, thereby realizing reduction of the prover's size.

(2) The slide valve is designed to be a cylinder having a row of ports radially made in its wall, which are the same in form and pitch as those made in the wall near the inlet-side end of the measuring conduit. It can rotate at a small angle of ½ pitch, assuring quick-response valve operation.

(3) At the outlet side of the measuring conduit, behind a set of the outlet-side ports, is also provided a set of pressure relieving ports of smaller size which, after the piston passing the first set of ports, acts to smoothly decelerate said piston to a stop without any undesirable shock.

(4) Provision of a cushion at the end of piston rod assures smooth and shock absorbed stopping of the piston, protecting it against any abnormal shock and stress.

(5) Between the piston actuator chamber and the prover body, both of which pressurized fluid passes through, is provided a position sensor which detects the given locations of the piston with safety and no affection of the pressurized fluid.

(6) Provision is made for compensating the nonuniformity of movement of the piston due to a difference of moving speeds of the slide valve and the piston for the transitional stage of the slide valve moving to cover the inlet-side port of the measuring conduit. Since the compensation for delay of the piston movement is achieved in the shortest time, it is possible to use a measuring conduit of reduced length, i.e. a small volume prover of smaller size.

(7) The measuring conduit is coaxially secured at one end to an outside flange having a guide ring and is open free at the other end, thereby eliminating the possibility of being deformed by the action of temperature and pressure of fluid. Centering of the conduit is achieved at an inside flange, eliminating the possibility of being affected by the external force. Using locking means allows easy mounting and centering of the measuring conduit within the prover body.

(8) The inlet-side end of the prover body is formed of a clutch door including a rotatable outer ring and a fixed inner ring which can be removed with the slide valve, allowing easily conducting of a repair of sealing members of the slide valve.

(9) It is possible to predict leakage through the slide valve by checking for leakage prior to a proving run.

(10) Leakage through the seals of the piston within the measuring conduit is easily detected, thereby increasing the reliability of measurement by the measuring conduit.

(11) Overhanging the measuring conduit on the outside flange of the prover body causes the necessity of checking for leakage in the annular passage. Detecting the leakage through seals in the annular passage is possible.

(12) Leakage detection can be easily carried out by a simply constructed easily operated detection system wherein fluid from a selected portion is introduced into a closed pressure reduction chamber and its pressure is reduced by changing the inner volume of the reduction chamber by means of an actuator-driven plunger.

We claim:
1. A small volume prover, comprising:
 a closed cylindrical outer housing having a fluid inlet in a wall near an inlet-side end thereof, and a fluid outlet in said wall near an opposite outlet-side end thereof;

a cylindrical measuring conduit of a constant inside diameter coaxially mounted within the housing, said conduit being open at an inlet-side end thereof and coaxially supported at an outlet end thereof by an inner end wall of the housing and having two axially apart spaced rows of ports radially in a wall of said conduit, one of said rows of ports being inlet-side ports and the other of said rows of ports being outlet-side ports;

an annular wall sealably dividing an annular passage formed between the measuring conduit and the outer housing into two sections, one section including said open conduit inlet-side end and the other section including said inlet-side ports;

a slide valve having a valve rod sealably extending through the inlet-side end of the outer housing and being slidable within the measuring conduit near the open inlet-side end thereof to open and close the inlet-side ports;

a piston having a piston rod sealably extending through the outlet-side end of the housing and being movable within a downstream portion of the measuring conduit rearwardly of the inlet-side ports to displace a base volume of fluid a certain amount between the inlet-side ports and the outlet-side ports, said piston having a thickness;

a valve actuator for driving the valve rod to control the slide valve to close the inlet-side ports only during a proving pass;

a piston actuator for actuating the piston rod to hold the piston at a starting position rearwardly of the inlet-side ports in the measuring conduit during a proving preparation, to render the piston movable during a proving test and to return the piston to the starting position;

a position sensor provided in the piston actuator for detecting that the piston passes a defined portion of the measuring conduit; and a row of pressure relieving ports, each of which is smaller than the outlet-side ports, and radially arranged in the wall of the measuring conduit at a downstream position apart from the outlet-side ports by a distance corresponding to the piston thickness.

2. A small volume prover of claim 1 wherein:
a pushing member is mounted within the slide valve and has a coaxially projecting protrusion,
a receiving member has an end movably inserted in an upstream end of the piston and a flanged end with a spring mounted thereon between the flanged end and the piston, and
said pushing member and said receiving member are positionable with a small spacing between the protrusion of the pushing member and the flanged end of the receiving member when no measurement is being conducted.

3. A small volume prover of claim 1 wherein the inlet-side end of the housing includes:
a clutch door comprising a liquid-tightly rotatable outer ring affixed to the inlet-side end of the housing and a stationary inner ring removably engaged with the rotatable outer ring and integrally mounting therein the slide valve and the valve actuator;
a linear driving means for moving the stationary inner ring in an axial direction of the measuring conduit; and
a turning means for horizontally turning the slide valve and the valve actuator when the slide valve and the valve actuator have been moved apart from the movable ring by means of the linear driving means.

4. A small volume prover, comprising:
a closed cylindrical outer housing having a fluid inlet in a wall near an inlet-side end thereof, and a fluid outlet in said wall near an opposite outlet-side end thereof;

a cylindrical measuring conduit of a constant inside diameter coaxially mounted within the housing, said conduit being open at an inlet-side end thereof and coaxially supported at an outlet end thereof by an inner end wall of the housing and having two axially apart spaced rows of ports radially in a wall of said conduit, one of said rows of ports being inlet-side ports and the other of said rows of ports being outlet-side ports;

an annular wall sealably dividing an annular passage formed between the measuring conduit and the outer housing into two sections, one section including said open conduit inlet-side end and the other section including said inlet-side ports;

a slide valve having a valve rod sealably extending through the inlet-side end of the outer housing and being slidable within the measuring conduit near the open inlet-side end thereof to open and close the inlet-side ports;

a piston having a piston rod sealably extending through the outlet-side end of the housing and being movable within a downstream portion of the measuring conduit rearwardly of the inlet-side ports to displace a base volume of fluid a certain amount between the inlet-side ports and the outlet-side ports;

a valve actuator for driving the valve rod to control the slide valve to close the inlet-side ports only during a proving pass;

a piston actuator for actuating the piston rod to hold the piston at a starting position rearwardly of the inlet-side ports in the measuring conduit during a proving preparation, to render the piston movable during a proving test and to return the piston to the starting position;

a position sensor provided in the piston actuator for detecting that the piston passes a defined portion of the measuring conduit; and the inlet-side end of the housing includes:
a clutch door comprising a liquid-tightly rotatable outer ring affixed to the inlet-side end of the housing and a stationary inner ring removably engaged with the rotatable outer ring and integrally mounting therein-the slide valve and the valve actuator;
a linear driving means for moving the stationary inner ring in an axial direction of the measuring conduit; and
a turning means for horizontally turning the slide valve and the valve actuator when the slide valve and the valve actuator have been moved apart from the movable ring by means of the linear driving means.

5. A small volume prover of claim 1 or 4, wherein:
the piston actuator includes a piston actuating cylinder with an inner end wall, the piston rod is integrally formed with the piston and has, at a free end thereof, a cushion member with a tapering spindle, and a concave portion having a constant cross-section substantially corresponding to a cross-section of the tapering spindle is provided in the inner end wall of the piston actuating cylinder, said tapering spindle of the cushion member being insertable in said concave portion.

6. A small volume prover of claim 1 or 4, wherein:

the piston rod is integrally formed with the piston and has two markers marked thereon apart from each other by a distance corresponding to a base volume of the measuring conduit, a position sensor for detecting said markers is provided in a wall of a cylindrical portion between the outer housing and the piston actuator, and sealing members are placed at both sides of said position sensor.

7. A small volume prover of claim 1 or 4 wherein:

a plate at the outlet-side of said housing comprises an inner flange secured to the outlet-side end plate of the housing and an outer flange coaxially fitted to the inner flange and having an internally protruding guide ring, the measuring conduit includes a plurality of locking holes radially provided in a wall thereof, and the measuring conduit is fitted at an inner surface at the outlet-side thereof onto the guide ring and is overhangingly secured to the outer flange by means of a plurality of L-shaped locking members, each member having one end inserted in a respective locking hole provided in the wall of the measuring conduit and another end threadably attached to the outer flange.

8. A small volume prover of claim 1 or 4 wherein through holes are provided in a wall of a body of the slide valve and in a plate at the inlet-side end of the outer housing and communicated with each other by means of a flexible tube provided with a pressure detecting means for detecting pressure therein.

9. A small volume prover of claim 1 or 4 wherein the piston has two sealing members on a periphery thereof adjacent to end surfaces thereof so as to be sealably mounted within the measuring conduit, and is provided with a conduit tube for leading pressure in an annular cavity formed between said sealing members out of the outer housing, and said conduit tube is provided with a pressure sensing means for sensing the pressure therein.

10. A small volume prover of claim 1 or 4 wherein the annular wall is provided with seal members on an inner periphery thereof adjacent to both ends thereof so as to be liquid-tightly slidable along an external surface of the measuring conduit, and is provided with a conduit tube for leading pressure in a cavity formed between said seal members out of the outer housing, and said conduit tube is provided with a pressure sensing means for sensing the pressure therein.

11. A small volume prover as defined in claim 1 or 4, which further includes:

a differential pressure generating unit comprising a sealed pressure reducing chamber, a plunger liquid-tightly and slidably mounted within the reducing chamber and an actuator for reciprocally displacing the plunger;

means for selectively connecting to the reducing chamber any of a pressure leading conduit tube from the slide valve, the annular wall and the piston; and a differential pressure gauge mounted between the reducing chamber and a standard pressure means.

12. A small volume prover, comprising:

a closed cylindrical outer housing having a fluid inlet in a wall near an inlet-side end thereof, and a fluid outlet in said wall near an opposite outlet-side end thereof;

a cylindrical measuring conduit of a constant inside diameter coaxially mounted within the housing, said conduit being open at an inlet-side end thereof and coaxially supported at an outlet end thereof by an inner end wall of the housing and having two axially apart spaced rows of ports radially in a wall of said conduit, one of said rows of ports being inlet-side ports and the other of said rows of ports being outlet-side ports;

an annular wall sealably dividing an annular passage formed between the measuring conduit and the outer housing into two sections, one section including said open conduit inlet-side end and the other section including said inlet-side ports;

a slide valve having a valve rod sealably extending through the inlet-side end of the outer housing and being slidable within the measuring conduit near the open inlet-side end thereof to open and close the inlet-side ports, the slide valve having a cylindrical form with a row of radially arranged ports corresponding in form and spacing to the inlet-side ports of the measuring conduit and being rotatable bidirectionally by $\frac{1}{2}$ of the spacing between the ports therein;

a piston having a piston rod sealably extending through the outlet-side end of the housing and being movable within a downstream portion of the measuring conduit rearwardly of the inlet-side ports to displace a base volume of fluid a certain amount between the inlet-side ports and the outlet-side ports, said piston having a thickness;

a valve actuator for driving the valve rod to control the slide valve to close the inlet-side ports only during a proving pass;

a piston actuator for actuating the piston rod to hold the piston at a starting position rearwardly of the inlet-side ports in the measuring conduit during a proving preparation, to render the piston movable during a proving test and to return the piston to the starting position;

a position sensor provided in the piston actuator for detecting that the piston passes a defined portion of the measuring conduit; and a row of pressure relieving ports, each of which is smaller than the outlet-side ports, and radially arranged in the wall of the measuring conduit at a downstream position apart from the outlet-side ports by a distance corresponding to the piston thickness.

* * * * *

UNITED STATES PATENT AND TRADEMARK OFFICE
CERTIFICATE OF CORRECTION

PATENT NO. : 5,392,632
DATED : February 28, 1995
INVENTOR(S) : Nobuyoshi Umeda, et. al.

It is certified that error appears in the above-indentified patent and that said Letters Patent is hereby corrected as shown below:

Title page, item [30] under the heading "Foreign Application Priority Data", change "1981" to 1991--so that the entry will indicate that the Japanese Priority Application was filed on October 14, 1991.

Signed and Sealed this

Thirtieth Day of May, 1995

Attest:

BRUCE LEHMAN

*Attesting Officer*      *Commissioner of Patents and Trademarks*